Feb. 11, 1958     T. P. MOOTE, JR., ET AL     2,823,216
PROCESS FOR PREPARATION OF CARBOXYLIC ACIDS
Filed Dec. 8, 1955
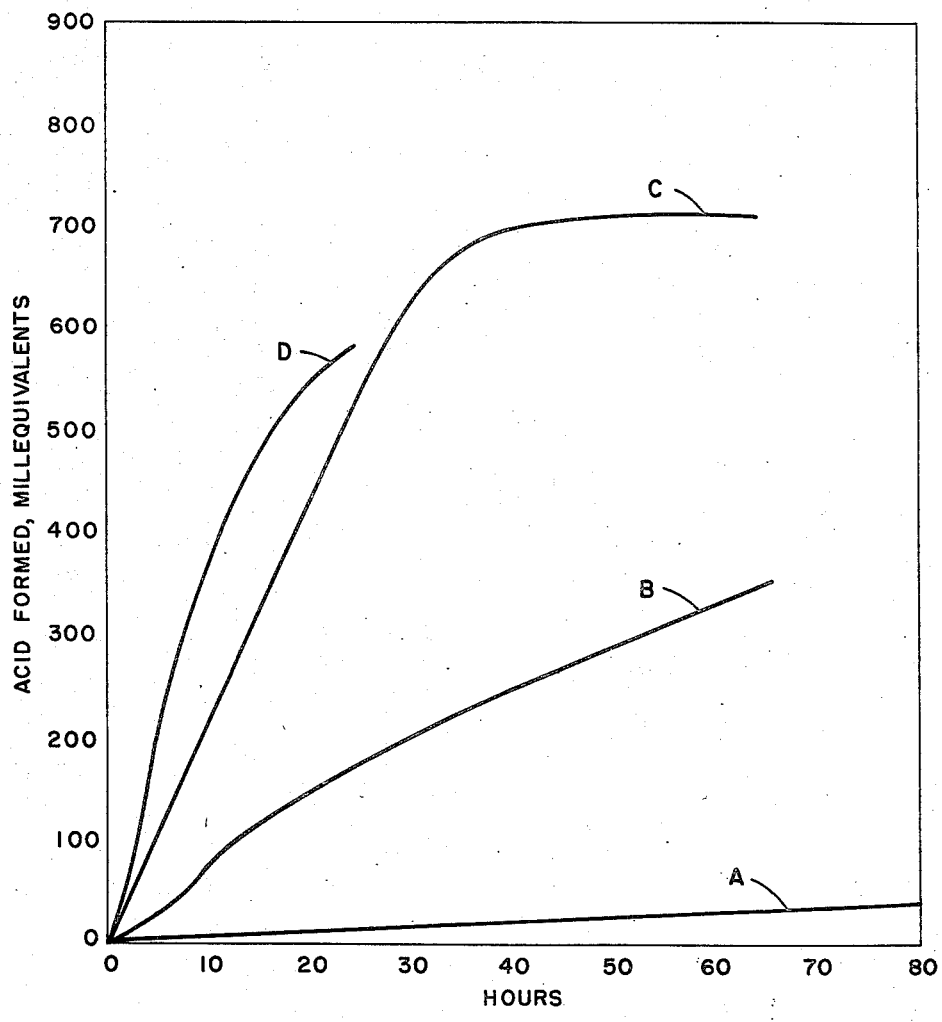
INVENTORS
TRUMAN P. MOOTE, JR.
ALFRED STEITZ, JR.
BY
ATTORNEY

# United States Patent Office 2,823,216
Patented Feb. 11, 1958

2,823,216
PROCESS FOR PREPARATION OF CARBOXYLIC ACIDS

Truman P. Moote, Jr., and Alfred Steitz, Jr., Tulsa, Okla., assignors to Pan American Petroleum Corporation, a corporation of Delaware Application December 8, 1955, Serial No. 551,912

14 Claims. (Cl. 260—413)

The present invention relates to a novel process for the preparation of higher molecular weight acids. More particularly, it pertains to the manufacture of such acids by reacting an olefin with a relatively low molecular weight carboxylic acid in the liquid phase.

It has been previously disclosed that ethylene can be made to react with carboxylic acids to produce an acid having from three to thirteen carbon atoms, however, in such work only a relatively small percentage of the final product acid was composed of one molecule of reacting acid and one molecule of ethylene. In most cases the major part of the reaction product, i. e., 75 to 80 percent, was composed of one molecule of reacting acid and two or more molecules of ethylene. In some instances telomerization of ethylene occurred to such an extent that appreciable quantities of the reaction products were of grease- or lard-like consistency. Apparently, under the reaction conditions afforded by the prior art the hydrocarbon portion adding on to the acid tended to undergo extensive telomerization.

It is an object of our invention to provide a method for the preparation of relatively high molecular weight carboxylic acids from primary olefins and low molecular weight carboxylic acids ranging from three to about eight carbon atoms. It is another object of our invention to produce addition products of said olefins and low molecular weight acids in which such products have an average molecular weight ranging from about 116 to about 250. It is a still further object to provide conditions favoring the formation, in predominating amounts, of a reaction product that is a 1:1 adduct of acid to olefin, i. e., a product acid in which the total number of carbon atoms present is equal to the sum of the carbon atoms present in the acid and olefin from which said product acid was derived. It is still a further object of our invention to provide conditions whereby acid production proceeds at a relatively high rate without lowering the proportion of the aforesaid 1:1 adduct formed.

The reaction is effected under conditions which favor the formation of free radicals which in turn serve as a catalyst, or initiator, for the principal reaction. As is already known these radicals can be formed, for example, by exposure of the reactants to ultraviolet light, by the addition of a suitable peroxide such as for example diacetyl, ditertiary-butyl or benzoyl peroxides. Also, various ether peroxides may be employed. Since the means by which the reaction of our invention is catalyzed forms no part thereof and since techniques for effecting such conditions of catalysis are well-known we shall hereafter refer to such conditions, where appropriate, as free radical forming conditions. Ordinarily, if a peroxide is used as the free radical former it is employed in molar ratios ranging from about 1:5 to about 1:15, i. e., peroxide to low molecular weight acid; preferably in the neighborhood of about 1:10. In cases where ultraviolet light is used as a means for providing free radical forming conditions we employ a light source having a wave length less than about 3000 A., typically 500 to about 2900 A. and preferably from about 2000 to 2500 A. Since ordinary glass or Pyrex type glass serves as a filter for light rays below about 3000 A., lamp envelopes made of such glass should be removed prior to use. The envelope or cover next to the source should be of quartz or other suitable light transmitting material such as, for example, calcium fluoride through which rays of desired wave length can pass. In practice we have found that a quartz ultraviolet lamp inserted into a suitable well also constructed of quartz serves as a satisfactory means for generating light of the required wave length. Since the reaction occurs in the liquid phase, the section of the quartz well containing the ultraviolet light should be submerged. This arrangement is used when initiating the reaction with an arc lamp which operates most efficiently at about 500° C. However, a resonance lamp can be submerged in the reaction mixture without using a quartz well. Its temperature for maximum efficiency is about 55° C. For a given quantity of acid product we have found that the amount of ultraviolet light required varies with the molar ratio of reacting acid to olefin employed. The effect of varying such molar ratio in accordance with the process of our invention will be discussed in greater detail below.

The temperature at which our invention is to be carried out will in general vary with the olefin used. Ordinarily it is preferred to operate at temperatures of from about 15° to 25° C. below the boiling point of the olefin up to about its boiling point, or the reflux temperature of the reaction mixture. However, when a peroxide is employed as the free radical initiator the reaction temperatures are necessarily limited to the decomposition temperature of the peroxide. Generally speaking, however, for the range of olefins contemplated it may be said that the reaction temperature to be employed in carrying out our invention may range from about 30° to about 200° C. at atmospheric pressure. This boiling range includes primary olefins or 1-alkenes ranging from 1-pentene to about 1-octadecene. Olefins such as propylene and 1-butylene may also be employed under conditions where they exist in the liquid state. Thus, with propylene the reaction temperature can not exceed 91° C. (the critical temperature thereof). At that temperature the pressure required to maintain propylene in the liquid phase is about 675 p. s. i. For 1-butylene the critical temperature is 160° C. and the pressure required at that temperature for liquid phase operation is about 630 p. s. i.

The carbon chain in which the olefin linkage appears may be either straight or branched; however, the olefin linkage itself should be primary, i. e., it should have the structure:

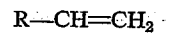

wherein R is a hydrocarbon residue.

The acids to be employed as reactants in the process of our invention are relatively low in molecular weight; however, they should contain at least 3 carbon atoms since we have been unable to obtain a reaction rate of any significance with acetic acid notwithstanding the fact that such an acid is known to react readily with ethylene. n-Butric and isobutyric acids are typical of other acids which we have found to undergo reaction with olefins of the type contemplated by our invention. Higher molecular weight aliphatic acids may be employed, however.

Pressures other than atmospheric can be used, however, if higher pressures are used a high ratio of olefin to acid is to be avoided.

From the standpoint of both rapid conversion and production of the 1:1 adduct of acid to olefin, previously mentioned, we have found that more favorable results in this regard are secured when the acid and olefin are reacted in a molar ratio of at least 5:1 and preferably in a molar ratio of at least about 10:1. Also the use of a suitable solvent such as toluene, benzene, xylene, and the like, and/or lower temperatures, i. e., 10–25° C. below the boiling point of the reaction mixture may tend to favor formation of the aforesaid 1:1 adduct in predominating amounts. Also, when employing ultraviolet light as the free radical initiator we have found that the formation of radicals increased by first eliminating certain impurities from the acid which cause it to darken when exposed to ultraviolet light for extended periods of time. This has been found to be true when the acid is initially water white. Thus, in practice, prior to reacting the acid with an olefin in accordance with our invention, we subject the acid itself to radiation with ultraviolet light. By this treatment impurities present which tend to darken on prolonged exposure to the light rays in the ultraviolet wave band are rendered less volatile. The resulting radiated acid is distilled and the distillate acid is found to be quite reactive when subsequently subjected to the conditions of our invention. In some instances we have made runs with acids purified in the manner just described and with unpurified acids from the same batch. In the case of the runs in which purified acids were used we found that the acid formation rate was approximately five times faster than that observed in the case of the unpurified material. These color forming impurities apparently include carbonyl components. They may be removed by means of a preliminary treatment of the acid with an aqueous bisulfite or hydroxylamine solution, a water wash or perculation through charcoal, silica gel, extraction of an aqueous solution of the acid salts with a light hydrocarbon or ethyl ether followed by regeneration of the acids from their salts in a known manner, etc.

The process of our invention may be further illustrated by the following specific examples. Reference is first made to the curves of the accompanying drawing which shows the effect of reactant molar ratios on rate of acid formation. The data on which these curves are based was obtained under the conditions stated in Example I below.

EXAMPLE I

A series of four runs was made in which the reaction was carried out at the reflux temperature of a mixture of 1-octene and propionic acid, i. e., about 130° C. A General Electric 100-watt ultraviolet quartz lamp was used after removal of the glass envelope so as to obtain light having a wave length less than about 3000 A. The lamp was placed in a quartz well which was immersed in the reaction mixture. Samples were taken at intervals and analyzed for product acid after having been water washed to remove free propionic acid from the 1-octene. Proportions of reactants and other conditions employed together with the results obtained are shown below:

Table I

| Run No. | Reaction Time, hrs. | Mole ratio $C_3$ acid/ octene | Rate of Acid Production, meq./hr. |
|---|---|---|---|
| 1 | 33 | 0.1 | 0.55 |
| 2 | 10.7 | 1 | 7.3 |
| 3 | 6.5 | 11.2–12.9 | 21.4 |
| 4 | 6.5 | ∞–33 | 40.0 |

Curves A, B and C of the above-mentioned drawing show the rates of product acid formation when employing starting ratios of propionic acid to 1-octene of 0.1, 1.0 and 10, respectively. From these results it is obvious that acid to olefin ratios as low as 1:1 are undesirable. In fact ratios below 5:1 do not appear promising. In curve D (run #4) the 1-octene was dropped continuously into boiling propionic acid at the rate of about 0.07 mole per hour and the resulting molar ratio of propionic acid to octene decreased from infinity down to about six. From these results it is seen that high ratios of reacting acid to olefin are desirable. Under conditions similar to those given above the use of ditertiary-butyl peroxide, benzoyl peroxide and other organic peroxides in a molar ratio of 10:1 of olefin to peroxide yields results similar to those given above.

EXAMPLE II

The reactants listed in the table below were employed in a series of eight different runs. In all cases the reaction was effected at approximately the reflux temperature of the reaction mixture. Proportions of reactants, type of ultraviolet light source employed and the duration of each run are given in the table.

Table II

| | Reactants | | | | | Product Acids | | | | | | |
|---|---|---|---|---|---|---|---|---|---|---|---|---|
| Run No. | Acid | Primary Olefin | React. Time, Hrs. | Mol Ratio, Acid/ Olefin | U. V. Lamp, Type | Distillation Temperature, °C. | Pressure, mm. Hg | Cut | Neutral Equivalent | | Distribution, Mol Percent of— | |
| | | | | | | | | | Uncorrected for Hydrocarbon | Corrected for Hydrocarbon | 1:1 Adduct | 1:2 Adduct [3] |
| 1 | $C_3$ | Hexene | 30 | 10.0 | Arc | 61 | 7–8 | Distillate | 158 | | 75 | |
| | | | | | | 135 | | Residue | | | | 25 |
| 2 | $C_3$ | ...do | 113 | 10.6 | Resonance | 136 | 61 | Distillate | 158 | | 72 | |
| | | | | | | 171 | | Residue | | | | 28 |
| 3 | $C_3$ | Octene | 98 | 9.9 | ...do | 154 | 20 | Distillate | [1] 212 | 192 | 75 | |
| | | | | | | 175 | | Residue | 855 | 372 | | 25 |
| 4 | $C_3$ | ...do | 100 | 1.0 | ...do | 126 | 20 | Distillate | [2] 868 | 260 | 27 | |
| | | | | | | 175 | | Residue | 1,172 | 368 | | 73 |
| 5 | $C_3$ | ...do | 72 | 1.0 | Arc | 85 | 6 | Distillate | | | 32 | |
| | | | | | | 137 | | Residue | | | | 68 |
| 6 | Iso $C_4$ | ...do | 30 | 10.0 | ...do | 79 | 5 | Distillate | 233 | | 89 | |
| | | | | | | 175 | | Residue | 765 | | | 11 |
| 7 | $C_4$ | ...do | 30 | 9.9 | ...do | 23 | 5 | Distillate | 212 | | 76 | |
| | | | | | | 160 | | Residue | 650 | | | 24 |
| 8 | $C_6$ | Hexene | 30 | 10.0 | ...do | 23 | 5 | Distillate | 179 | | 86 | |
| | | | | | | 155 | | Residue | 560 | | | 14 |

[1] 9% hydrocarbon.
[2] 70% hydrocarbon.
[3] This product contained at least two moles of olefin to one of acid.

The data in the above table indicate that the molecular weight distribution of the product acid changes very markedly with the change in molar ratio of the reacting acid and olefin. Thus, with an initial ratio of acid to olefin in a proportion of 10 moles of acid to 1 of olefin the distribution of product acid is about 75–85 mole percent of the 1:1 adduct (composed of 1 mole of reacting acid and 1 mole of olefin) and about 15–25 mole percent of the 1:2 adduct. At a starting ratio of 1 mole of acid to 1 mole of olefin the distribution of product acid is about 25–30 mole percent 1:1 adduct and 70–75 mole percent of the 1:2 adduct. Actually, as the neutral equivalents indicate in the above table, the products obtained from a reaction mixture having reacting acid and olefin present in a ratio of about 1:1 possess a high hydrocarbon content. This indicates that under such circumstances the olefin itself polymerized and the resulting polymer, together with product acid, passed overhead as distillate.

In view of the foregoing description, numerous variations of the process of our invention will be apparent to those skilled in the art. Fundamentally, our invention contemplates the reaction, in the liquid phase, of a primary olefin with carboxylic acids of the type described above to produce a product consisting primarily of a carboxylic acid having a total number of carbon atoms equivalent to the sum of the carbon atoms in the reacting acid and olefin. Accomplishment of such a result in the presence of free radical forming conditions is considered to lie within the scope of our invention.

We claim:

1. In a process for the preparation of organic acids from a primary olefin and an aliphatic carboxylic acid, the improvement which comprises producing at least about 70 mole percent of a carboxylic acid product in which the molar ratio of olefin to the reacting acid is 1:1 by reacting in the liquid phase a primary olefin having from 5 to 18 carbon atoms with an aliphatic carboxylic acid under free radical forming conditions, said acid and olefin being present in the reaction mixture in a molar ratio of at least about 10:1 and at a temperature ranging from about 15° to about 25° C. below the boiling point of the olefin up to about the reflux temperature of said reaction mixture at about atmospheric pressure.

2. The process of claim 1 in which the olefin employed contains from five to eighteen carbon atoms and the reacting carboxylic acid contains from three to seven carbon atoms.

3. The process of claim 2 in which the olefin employed contains from five to eight carbon atoms.

4. The process of claim 2 wherein the free radical forming conditions are produced by means of an organic peroxide.

5. The process of claim 2 wherein the free radical forming conditions are produced by means of ultraviolet light having a wave length of less than 3000 A.

6. The process of claim 5 in which the wave length of the ultraviolet light employed ranges from about 500 to 2900 A.

7. The process of claim 5 in which the ultraviolet light employed has a wave length ranging from 2000 to 2500 A.

8. The process of claim 4 in which the organic peroxide is di-tertiary-butyl peroxide.

9. The process of claim 4 in which the organic peroxide is benzoyl peroxide.

10. The process of claim 2 in which the olefin is 1-hexene and the carboxylic acid is propionic acid.

11. The process of claim 2 in which the reacting acid is a butyric acid and the olefin is 1-octene.

12. The process of claim 2 in which the reacting acid is hexanoic acid and the olefin is 1-hexene.

13. The process of claim 2 in which the reacting acid is propionic acid and the olefin is 1-octene.

14. The process of claim 5 in which the color forming impurities present in the aliphatic carboxylic acid are removed prior to reaction with said olefin.

References Cited in the file of this patent

UNITED STATES PATENTS

| | | |
|---|---|---|
| 2,402,137 | Hanford et al. | June 18, 1946 |
| 2,433,015 | Roland et al. | Dec. 23, 1947 |
| 2,585,723 | Banes et al. | Feb. 12, 1952 |